Dec. 24, 1940.     L. W. WILLIAMS     2,225,813
FILTER
Filed Nov. 29, 1938     2 Sheets-Sheet 1
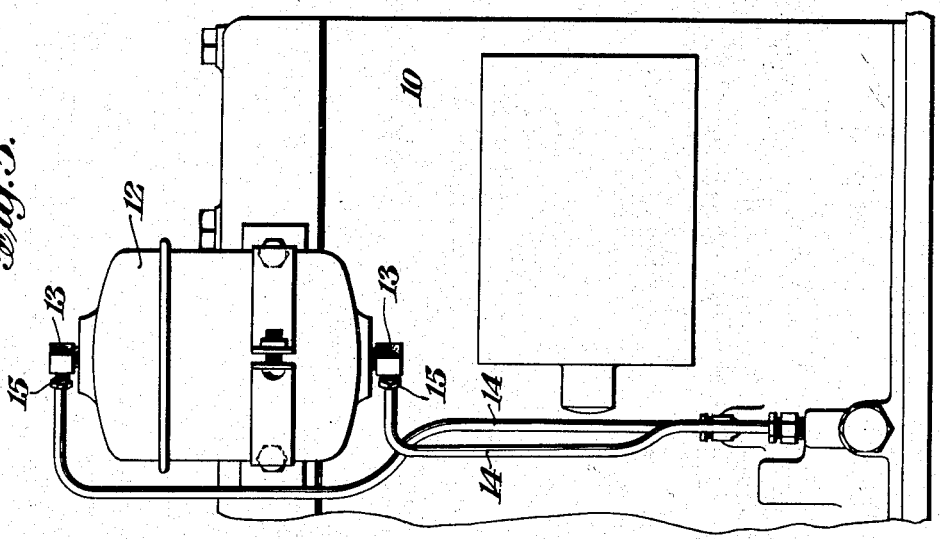
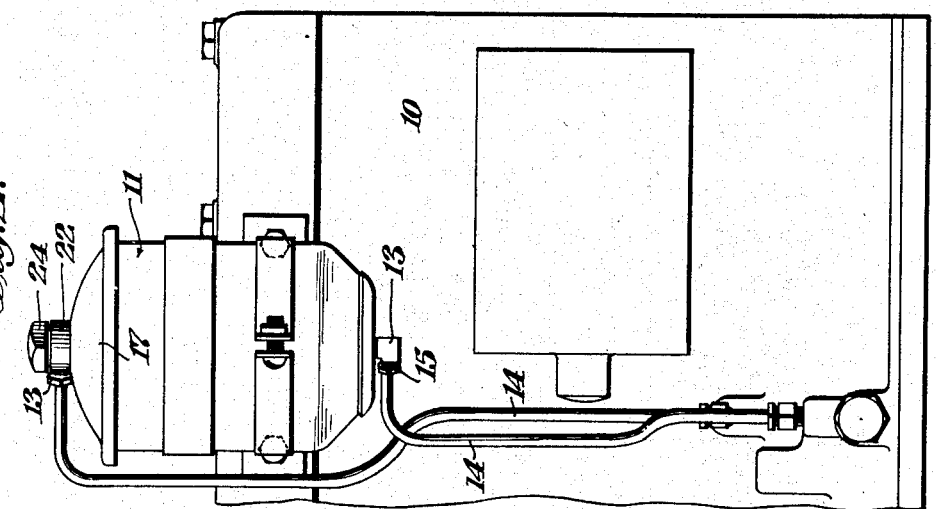
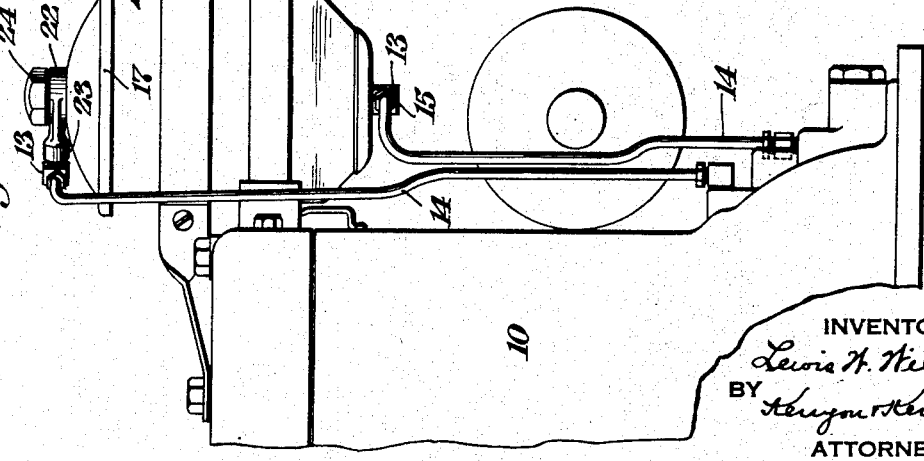
INVENTOR
Lewis W. Williams
BY Kenyon & Kenyon
ATTORNEYS.

Dec. 24, 1940. L. W. WILLIAMS 2,225,813
FILTER
Filed Nov. 29, 1938 2 Sheets-Sheet 2
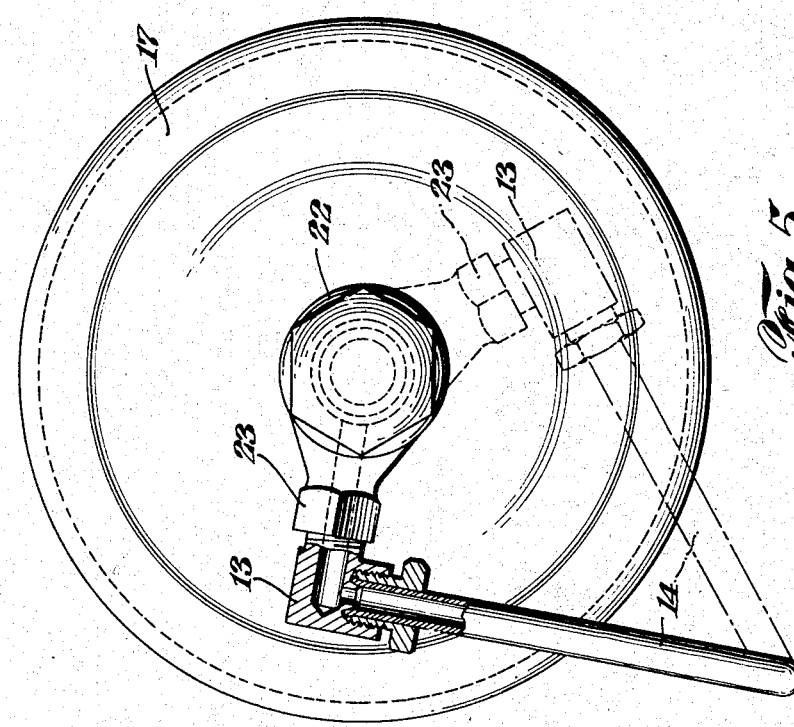
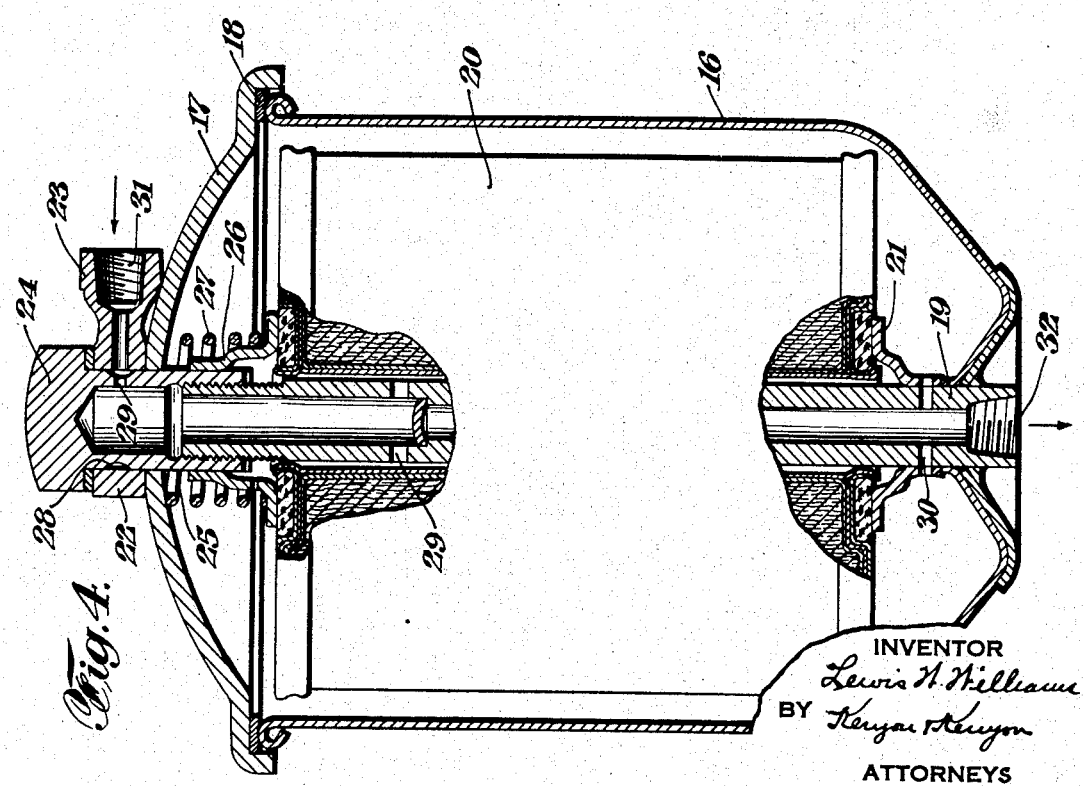
INVENTOR
Lewis W. Williams
BY Kenyon & Kenyon
ATTORNEYS Patented Dec. 24, 1940

2,225,813

UNITED STATES PATENT OFFICE 2,225,813

FILTER

Lewis W. Williams, Short Hills, N. J., assignor to Motor Improvements, Inc., Newark, N. J., a corporation of Delaware Application November 29, 1938, Serial No. 242,899

2 Claims. (Cl. 210—164)

This invention relates to filters and more especially to filters for use in connection with the lubricating system of an internal combustion engine.

For many years past, the engines of certain makes of automobiles have been factory equipped with sealed can filters of definite height and cross-section. Contaminated oil is supplied to and clean oil discharged from such filters through ports at the top and the bottom of the can. To connect the cans to the supply and discharge pipes, elbow fittings are threaded into the said ports and the ends of the pipes are attached to the fittings by detachable connections. The pipes are attached to the engine block and are of proper length just to reach the elbow fittings. When it is desired to replace a spent filter, the pipes are disconnected from the fittings, thereby permitting removal of the can with the elbow fittings still in place. The elbow fittings are then transferred from the spent can filter to the fresh can filter and after the fresh can filter is properly located, the pipes are again connected to the fittings.

Recently, there has been developed as a replacement for the sealed can filter above described, a renewable cartridge type filter in which the can is composed of a body portion and a detachable cover portion. When such a filter becomes spent, it is reconditioned merely by substituting a new cartridge. As a new cartridge is cheaper than the sealed can filter, a motorist can very materially reduce his filter expense over a period of time by replacing the factory equipped sealed can filter with a cartridge type filter even though the initial cost of the cartridge type filter exceeds the cost of a replacement sealed can filter.

An object of this invention is a removable cartridge type filter such that it can be substituted for the sealed can filter without any change in the supply and discharge pipes and by use only of the fittings already in use for connecting the sealed can filter to the supply and discharge pipes.

In a preferred form of filter embodying the invention, there is provided in the bottom of the body a port properly threaded to receive the bottom elbow fitting of the sealed can filter and the cover is attached to the body through the medium of a nut rotatably supported by the cover and screwed on to a post carried by the body. The nut extends through a boss carried by the cover and the boss is provided with a tubular projection properly threaded at its outer end to receive the upper elbow fitting of the sealed can filter. The threaded projection communicates with the interior of the boss and provides an oil passageway. The tubular projection is so located on the boss that when the filter is in its normal vertical position, the projection extends horizontally with the same distance between the horizontal center line of the projection and the horizontal center line of the bottom elbow fitting as previously existed between the horizontal center lines of the two elbow fittings when associated with the sealed can filter. Thus, to substitute the cartridge type filter for the sealed can filter, it is necessary only to attach to the cartridge type filter the elbow fittings of the sealed can filter, one elbow fitting in the bottom port of the cartridge type filter and the other elbow fitting in the tubular projection at the top of the cartridge type filter and so adjust the top elbow fitting that the passage therethrough is horizontal throughout its entire length. Then, after having made connection between the bottom elbow fitting and the proper pipe, exactly as in the case of the sealed can filter, the remaining pipe may be attached to the top elbow fitting merely by springing it slightly to bring it into alinement with the top elbow fitting which is oriented into proper position by rotation of the cover on the body. To replace a spent cartridge, it is necessary only to disconnect the top elbow fitting from its associated pipe, unscrew the nut to free the cover, lift out the spent filter cartridge, insert a fresh cartridge, reattach the cover and reconnect the top elbow fitting to its associated pipe.

Other objects, novel features and advantages of this invention will become apparent from the following specification and accompanying drawings, wherein:

Fig. 1 is a fragmentary end elevation of an internal combustion engine equipped with a removable cartridge-type filter;

Fig. 2 is a fragmentary front elevation of the same;

Fig. 3 is a view similar to Fig. 2 showing the sealed can filter for which the cartridge-type filter is a replacement;

Fig. 4 is a vertical section through the removable cartridge type filter, and

Fig. 5 is a plan view thereof.

In Figs. 1 to 3 inclusive, 10 indicates an internal combustion engine of any well-known type and in Figs. 1 and 2, 11 indicates a cartridge-type filter supported by the engine through the means of suitable straps, while in Fig. 3, 12 indicates a sealed can type filter also supported from the engine 10 by a suitable strap.

Referring now to Fig. 3, the filter is provided with inlet and outlet ports in the top and bottom portions of the can and the ports are suitably tapped to receive the screw-threaded ends of elbow fittings 13 having portions extending perpendicular to the axis of the filter 12 for attachment thereto of oil supply and discharge pipes 14 suitably attached to the engine and communicating with the oil circulating system thereof. Pipes 14 are of proper length and shape just to reach the fittings 13 to which they are attached by suitably connecting members 15 of standard construction. The above-described installation is made at the factory at the time and because of the small space available around the engine after it is mounted in the chassis and because of the tightness of the connections made when installing, it is an extremely difficult job to replace the piping for the purpose of installing a replacement filter of a different type than that with which the engine was factory equipped. However, it is a comparatively simple matter to replace the original filter with a filter of the same construction, it being necessary only to disconnect the members 15, release the supporting strap and lift out the filter after which the elbow fittings are removed and inserted in the new filter and the latter connected to the pipes in the same manner as the original.

The removable cartridge type filter 11 is designed to make it possible to use it as a replacement for the sealed can type filter 12 without any re-arrangement of or substitution for the pipes 14 and to make the substitution of the filter 11 for the filter 12 as simple an operation as the replacement of a spent filter 12 with a new filter of the same type.

As clearly shown in Fig. 4, the casing for the filter 11 comprises a cup-shaped body 16 and a detachable cover 17 in combination with a gasket 18 for producing an oil-tight joint between the body and cover. A post 19 extends through an aperture in the bottom of the body 16 above the top rim of the body, the post being supported by the body bottom with a fluid-tight joint therebetween. A filtering unit 20 surrounds the post 19 and its lower end rests upon a shoulder 21. A boss or collar 22 is attached to the outer face of the cover 17 centrally thereof and is provided with a tubular projection 23 extending at right angles to the axis of the post 19. A nut 24 has a tubular portion 25 extending through the boss 22 and collar 17 and having threaded connection with the top of the post 19. On the tubular portion 25 is slidably mounted a collar 26 which engages the top of the filter unit 20 and is compressed against the same by a spring 27. The interconnection of the nut 24 with the post 19 serves to clamp the cover 17 to the body 16 while the collar 26 coacts with the shoulder 21 to support the filtering unit 20. The passageway in the projection 23 communicates with an annular groove 28 in the stem 25 and the groove in turn communicates with the interior of the stem 25 through apertures 29. The upper portion of the post 19 is hollow and communicates through apertures 29 with the interior of the filtering unit 20. Likewise, the lower portion of the post 19 is hollow and communicates through the passageways 30 with the interior of the body 16. There is, however, no through passage through the post 19 so that the only communication between the upper and lower hollow portion of the post is through the filtering unit 20, the support 21 and collar 26 serving to prevent short-circuiting of flow around the filter unit. The projection 23 is provided with a tapped socket 31 and the post 19 is provided at its lower end with a similarly tapped socket 32.

Replacement of the sealed can filter 12 by the removable cartridge type filter 11 is made as follows: The bottom elbow fitting 13 originally used with the sealed can filter 12 is screwed into the socket 32 and the top elbow fitting 13 of the sealed can filter is threaded into the socket 31 and is so arranged that its center line lies in a plane perpendicular to the axis of the boss 22 so that when the filter 16 is in the vertical position shown in Figs. 1 and 2, the axis of the elbow socket 31 is horizontal. The bottom elbow fitting 13 is connected to the proper pipe 14 by means of the connector 15 in the same manner as the connection was made when the sealed can filter 12 was originally installed. With the nut 24 slightly loosened, the cover 27 is oriented to the extent required and the remaining pipe 14 is suitably sprung to bring the connector 15 into proper position with respect to the top fitting 13 to permit screwing the connector into the fitting. The nut 24 is then tightened to produce an oil tight seal between the can and cover.

When the cartridge or filtering unit 20 has become spent, the procedure of replacing it with a fresh cartridge is as follows: The pipe 14 leading to the top elbow fitting 13 is disconnected therefrom by unscrewing the connector 15 after which the nut 24 is unscrewed from the post 19 and the cover 17 removed. The spent filter cartridge is then lifted out and a fresh cartridge inserted after which the cover 17 is replaced, the nut 24 screwed on to the post 19 and the pipe 14 reconnected to the fitting 13 as previously described.

Fig. 5 illustrates in full lines the arrangement of the projection 23 and the associated elbow fitting 13, in one of two possible positions and in dotted lines illustrates the other possible position. Either of the two positions may be used, depending upon various conditions of which one is the angular relation of the elbow fitting when it becomes tight in the socket 31. Should it happen that the fitting becomes tight with its socket in a position other than horizontal, it may be forced through the arc of less than 180° necessary to bring it into horizontal position without injury to the threads while rotation through an arc greater than 180° very probably would damage the threads. Therefore, the fitting may be forced into the next horizontal position beyond the position at which it became tight in its socket and the cover 17 oriented properly to permit connection of the pipe 14 to the fitting 13 either in the position shown in full lines in Fig. 5 or the position shown in dotted lines in the same figure.

I claim:

1. In a filter, a casing comprising a body and a cover having an aperture, a post supported at one end by said casing and having a passageway in said end leading to the exterior of the casing, a hollow cap nut rotatably supported by said cover with a portion thereof extending through said aperture and having screw-threaded connection with the remaining end of said post, a collar rotatably supported by said nut exterior of said casing, a tubular projection carried by said collar, a passageway connecting the interior of said projection to the interior of said nut, a filter unit supported by said post, and passageways in said post for directing liquid from the interior of said nut through said filter unit to said first-mentioned post passageway.

2. In a filter, a casing comprising a body and a cover having an aperture, a post supported at one end by said casing and having a passageway in said end leading to the exterior of the casing, a hollow cap nut rotatably supported by said cover with a portion thereof extending through said aperture and having screw-threaded connection with the remaining end of said post, a collar rotatably supported by said nut exterior of said casing, a tubular projection carried by said collar, a passageway connecting the interior of said projection to the interior of said nut, a filter unit supported by said post, passageways in said post for directing liquid from the interior of said nut through said filter unit to said first mentioned post passageway, and an elbow fitting mounted on the end of said tubular member with its center line lying in a plane perpendicular to said body axis.

LEWIS W. WILLIAMS.